US009636898B2

(12) United States Patent
Ganninger et al.

(10) Patent No.: US 9,636,898 B2
(45) Date of Patent: May 2, 2017

(54) DEVICE FOR FUSING THE ENDS OF THERMOPLASTIC FILAMENTS

(71) Applicant: The Gillette Company, Boston, MA (US)

(72) Inventors: Jochen Ganninger, Eschborn (DE); Jia-Wei Chiu, Frankfurt (DE); Karl Herzog, Frankfurt am Main (DE)

(73) Assignee: THE GILLETTE COMPANY LLC, Boston, MA (US)

( * ) Notice: Subject to any disclaimer, the term of this patent is extended or adjusted under 35 U.S.C. 154(b) by 319 days.

(21) Appl. No.: 14/570,240

(22) Filed: Dec. 15, 2014

(65) Prior Publication Data

US 2015/0165740 A1 Jun. 18, 2015

(30) Foreign Application Priority Data

Dec. 18, 2013 (EP) .................................... 13198128
Dec. 8, 2014 (EP) .................................... 14196744

(51) Int. Cl.
*A46B 3/06* (2006.01)
*B29C 65/14* (2006.01)
(Continued)

(52) U.S. Cl.
CPC .............. *B32B 37/065* (2013.01); *A46B 3/06* (2013.01); *A46D 3/045* (2013.01);
(Continued)

(58) Field of Classification Search
CPC .............. A46B 3/06; A46B 2200/1066; B29C 65/1412; B29C 65/1432; B29C 65/1448;
(Continued)

(56) References Cited

U.S. PATENT DOCUMENTS 4,635,313 A * 1/1987 Fassler ..................... A46B 3/04
15/193
4,637,660 A * 1/1987 Weihrauch ............... A46B 3/06
264/243
(Continued)

FOREIGN PATENT DOCUMENTS

DE   198 53 030 A1   5/2000
EP   0 150 785 A2    8/1985
(Continued)

OTHER PUBLICATIONS

European Search Report for CM4027FQ dated May 2, 2014.

*Primary Examiner* — Michael Tolin

(57) ABSTRACT

A method of fusing without contact the ends of thermoplastic filaments grouped together to form at least two tufts. The method steps include providing at least two tufts of thermoplastic filaments arranged at a distance to each other, providing a heating plate at least partly made from a conductive material and structured to have at least two heating sectors separated from one another by at least one separation sector arranged for emitting at least less thermal radiation then the heating sectors, each of the heating sectors having conductive material and a heating surface corresponding in shape and position to the shape and position of the ends of the tufts, exposing the ends of the tufts to the heating plate such that the tuft ends and the heating sectors are aligned with each other, and generating an electric-current flow through the heating sectors so that the heating surfaces of the heating sectors emit thermal radiation that is absorbed by the ends of the filaments, whereby the ends of the filaments melt and the filaments of each tuft are fused together.

22 Claims, 9 Drawing Sheets

(51) Int. Cl.
  *B32B 37/06* (2006.01)
  *B32B 37/00* (2006.01)
  *B29C 65/00* (2006.01)
  *A46D 3/04* (2006.01)
  *B29L 31/42* (2006.01)
  *B29C 65/60* (2006.01)

(52) U.S. Cl.
  CPC ...... *B29C 65/1412* (2013.01); *B29C 65/1448* (2013.01); *B29C 65/1464* (2013.01); *B29C 65/1467* (2013.01); *B29C 66/126* (2013.01); *B29C 66/12421* (2013.01); *B29C 66/137* (2013.01); *B29C 66/3472* (2013.01); *B29C 66/532* (2013.01); *B29C 66/69* (2013.01); *B29C 66/73921* (2013.01); *B32B 37/0046* (2013.01); *A46B 2200/1066* (2013.01); *B29C 65/608* (2013.01); *B29C 66/12441* (2013.01); *B29C 66/8122* (2013.01); *B29C 66/8187* (2013.01); *B29C 66/81262* (2013.01); *B29C 66/81423* (2013.01); *B29C 66/81425* (2013.01); *B29C 66/81811* (2013.01); *B29C 66/81821* (2013.01); *B29L 2031/425* (2013.01)

(58) Field of Classification Search
  CPC ............ B29C 65/1464; B29C 65/1467; B29C 66/3472; B29C 66/69; B29C 66/7392; B29C 66/73921; B29C 67/0044; B29L 2031/425
  See application file for complete search history.

(56) References Cited

U.S. PATENT DOCUMENTS

| | | | | |
|---|---|---|---|---|
| 4,649,259 | A * | 3/1987 | Zurn | B29C 65/18 156/583.1 |
| 4,892,698 | A * | 1/1990 | Weihrauch | A46B 3/06 264/243 |
| 5,045,267 | A * | 9/1991 | Weihrauch | B29C 45/14385 264/243 |
| 5,823,633 | A * | 10/1998 | Weihrauch | A46B 3/04 15/191.1 |
| 6,582,028 | B2 * | 6/2003 | Buchholz | A46D 3/005 264/243 |
| 6,702,394 | B2 * | 3/2004 | Boucherie | A46D 3/045 156/72 |
| 2012/0317738 | A1 * | 12/2012 | Birk | A46B 3/06 15/167.1 |
| 2013/0146227 | A1 * | 6/2013 | Mileti | B32B 37/06 156/583.1 |

FOREIGN PATENT DOCUMENTS

| | | |
|---|---|---|
| EP | 0 676 268 A1 | 10/1995 |
| EP | 2 534 973 A2 | 12/2012 |

* cited by examiner

A - A

C - C

B - B

D-D

DEVICE FOR FUSING THE ENDS OF THERMOPLASTIC FILAMENTS

FIELD OF THE INVENTION

The present invention is concerned with a device for fusing without contact the ends of thermoplastic filaments grouped into tufts. The present invention is also concerned with a method of fusing without contact the ends of thermoplastic filaments.

BACKGROUND OF THE INVENTION

It is known that ends of thermoplastic filaments grouped to a tuft can be fused together by applying heat to the end of the filaments such that the ends of the filaments melt and the molten material forms a ball-like structure that connects all filaments of the tuft. Such a ball-like structure typically also has a larger diameter than the tuft and thus supports the fixation of the tuft in a carrier material that may be injection molded around the end of the tuft. The heat may be applied in various ways, e.g. by contacting the filament ends with a hot plate, by applying a stream of hot air to the ends of the filaments or by exposing the ends of the filaments to heat radiation. EP 0 676 268 A1 generally discusses the process of fusing the ends of filaments grouped into tufts by use of a hot air gun or a heating plate.

Document DE 198 53 030 A1 describes a fusing method in which a heating block, which comprises heating elements to heat the block, emits heat radiation to be received by the ends of filament tufts. The heating block comprises a channel for additional emission of hot air towards a larger sized filament tuft so that all tufts are heated within the same time amount independent on the tuft size.

Document EP 2 534 973 A2 describes a hot gas device having a multiplicity of gas nozzles for applying varying flows of hot gas towards tuft ends and an infrared radiation device comprising a plurality of infrared radiation sources each having a reflector for applying varying degrees of infrared radiation towards the tuft ends. The individual nozzles or reflectors may be arranged at consistent distances or at different distance to the tuft ends.

Document EP 0 150 785 A2 discusses a heating element that has individual heating pins for melting recesses into a tuft carrier. Further, another heating element is discussed that on one side has a hemispherical mold surface on one side of the heating element and another mold surface in the form of a shallow cone on another side of the heating element. The heating element has two heating units for keeping the two sides of the heating element on different temperatures. This heating element is intended for contact heating and thereby providing a respective shaping of the mating partners, namely the tuft carrier on one side and the tuft end on the other side.

It is an object of the present disclosure to provide a device and a method to fuse without contact the ends of thermoplastic filaments grouped to tufts that is improved over the prior art or that at least provides an alternative.

SUMMARY OF THE INVENTION

In accordance with one aspect there is provided a device for fusing without contact the ends of thermoplastic filaments grouped into at least two tufts arranged with a distance to each other, the device comprising a heating plate that is at least partly made of a conductive material for emitting thermal radiation when an electric current flows through the conductive material, wherein the heating plate is structured such that at least two heating sectors each comprising conductive material are formed that are separated from each other by at least one separation sector arranged for emitting at least less thermal radiation then the heating sectors and that each heating sector has a heating surface on a heating side of the heating plate, where each of the heating surfaces has an area in a range of between about 0.25 mm$^2$ to about 250 mm$^2$, in particular wherein at least one of the heating surfaces has an area below 100 mm$^2$.

In accordance with one aspect there is provided a method of fusing without contact the ends of thermoplastic filaments grouped together to form at least two tufts arranged with a distance to each other having the steps of providing an arrangement of at least two tufts of thermoplastic filaments, which tufts have ends that are arranged with a distance to each other, providing a heating plate at least partly made from a conductive material, which heating plate is structured so that at least two heating sectors are formed that are separated from each other by at least one separation sector arranged for emitting at least less thermal radiation then the heating sectors, the heating sectors each comprising conductive material and each of the heating sectors having a heating surface on a heating side of the heating plate, which heating surfaces correspond in shape and position to the shape and position of the ends of the tufts, exposing the ends of the tufts to the heating plate such that the tuft ends and the heating sectors are aligned with each other, and generating an electric current flow through the heating sectors so that the heating surfaces of the heating sectors emit thermal radiation that is absorbed by the ends of the filaments such that the ends of the filaments melt and the filaments of each tuft are fused together.

BRIEF DESCRIPTION OF THE DRAWINGS

The herein proposed device and method will be further elucidated by a detailed description of general aspects and of example embodiments. The further description also refers to figures for ease of understanding the proposed device and method. In the figures

DETAILED DESCRIPTION OF THE INVENTION

Figure 1A:
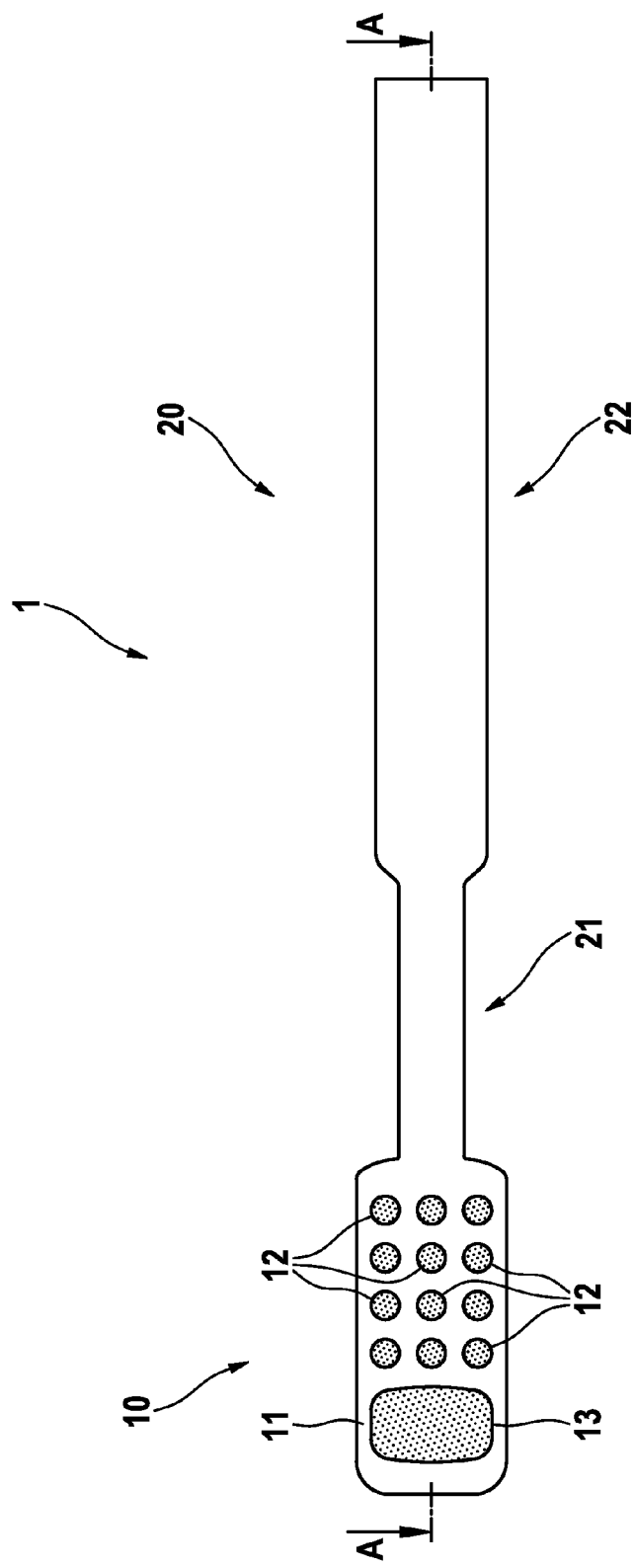
FIG. 1A is a schematic depiction of a toothbrush in a top view, the toothbrush comprising tufts of thermoplastic filaments, where some tufts have different cross-sectional shape and different cross sectional area.

The device and method proposed herein relate to the feature of selectively (and in particular in a contact-free manner) heating the tuft ends of an arrangement of at least two tufts of thermoplastic filaments to be each fused by a heating plate having heating sectors with heating surfaces on a heating side of the heating plate. The heating surfaces are of identical or at least similar shape as the shape of the tuft ends and they also essentially coincide in their relative positions. Optionally the heating surfaces have the same or a somewhat larger area than the tuft ends of the arrangement of tufts. The at least two heating sectors and their respective heating surfaces are separated by at least one separation sector that at least partly borders the heating surfaces, which separation sector is arranged to emit less thermal radiation than the heating surface. In some embodiments, the separation sector is at least partly realized as a gap, e.g. as a through-hole through the heating plate or as a cut-out (and thus emits no thermal radiation), which should not exclude that the heating sectors are, in some embodiments, electrically connected by bridges of conducting material. In embodiments with three or more heating sectors, each neighboring pair of heating sectors is separated by a separation sector.

In accordance with the present disclosure, the heating sectors comprise conducting material. In some embodiments, the heating surfaces are made of the conducting material. In some embodiments, the heating sectors comprise a heating surface that is at least in part made from an electrically not conducting material (e.g. from ceramic material), which may have been coated to a conducting material layer to generate an emission surface, in particular a rough emission surface. In some embodiments, the separation sector is realized at least in part from an electrically isolating material. In some embodiments, the separation sector comprises a conducting material that does not emit as much thermal emission as the heating sectors, e.g. by having a lower resistivity or a larger volume or a different surface roughness.

In contrast to previously known methods employing an essentially unstructured large size heating plate for contact-free fusing, the present method and device particularly emits thermal radiation via the heating surfaces of the heating sectors (and not via infra-red radiation lamps or the like), which heating surfaces are aligned in shape and position (and optionally size) with the tuft ends. The heating surfaces can be heated to a degree that the thermal radiation is sufficient to melt the tuft ends provided at a certain distance in an emission direction. The distance between the tuft ends and the heating surfaces during the fusing process may lie in a range of between about 0.05 mm and about 5 mm, optionally in a range of between about 0.1 mm and about 2 mm. Measurements have been made between 0.1 mm and 1.6 mm. The temperature of the heating surfaces had been in a range of between 500 degrees Celsius to about 800 degrees Celsius in these measurements. While it is believed that any conducting material around the heating sectors used for electric connection of the heating sectors to allow an electric current flow through the whole heating plate can be cooled by ambient air such that the temperature of the conducting material around the heating sectors will always be considerable lower than the material of the heating sectors, it may additionally be considered that an active cooling of the material of the heating plate outside of the heating sectors is provided. Such cooling may in particular be used in embodiments, where the heating sectors are embedded in electrically isolating material (see below).

In some embodiments, the heating surfaces of the heating sectors of the heating plate are made of a conductive material having a higher resistance than the resistance of a conducting material forming the at least one separation sector at least partly bordering the heating sectors. In some embodiments, this is a result of a layer of conductive material at the location of the heating sectors that is thinner than the layer thickness of a conductive material forming at least partly the separation sector and/or this is a result of a higher resistivity conductive material used to realize the heating sectors in comparison to the conductive material forming at least partly the separation area. Sufficient thermal radiation will be emitted when a sufficient electric current is flowing through the heating sectors, i.e. electric currents of typically up to 200 Ampere. In some embodiments, the layer thickness of the conductive material forming the heating sectors is about or below 1.0 mm, in particular below 900 µm, below 800 µm, below 700 µm, below 600 µm, below 500 µm, below 400 µm, below 300 µm, below 200 µm, or below 100 µm. In some embodiments, a layer thickness of the conductive material forming the heating sectors is around 500 µm, e.g. in a range of between 250 µm to 750 µm or in a range of between about 400 µm to about 600 µm. In some embodiments, the layer thickness of conductive material in the separation sector is above 1.0 mm, in particular above 1.5 mm, above 2.0 mm, above 3.0 mm, above 4.0 mm, above 5.0 mm, or above 10 mm.

In some embodiments, the thermoplastic filaments may be made essentially from Nylon (e.g. polyamide (PA) 6.6, polyamide 6.10, polyamide 6.12) or from polybutylene terephthalate (PBT), where for example PA 6.6 has a melting temperature of 260° Celsius. In some embodiments, the heating sectors are realized by conductive material embedded in electrically isolating material. Generally and in particular in the latter embodiments, an electric current through the heating sectors may be an eddy electric current induced by an inductive unit as will be explained further below.

A heating sector in the present disclosure is a structured portion of the heating plate comprising conductive material, which structured portion has a heating surface on the heating side of the heating plate that tends to emit a higher amount of thermal radiation than surface areas of the separation sector that at least partly borders the respective at least two heating sectors, in particular as the heating sector comprises conductive material having a higher resistance than conductive material in adjacent (i.e. bordering) areas of the heating plate or because the heating sector is embedded in an isolating material.

Electrical resistivity ρ (also known as resistivity, specific electrical resistance, or volume resistivity) quantifies how strongly a given material opposes the flow of electric current. A low resistivity indicates a material that readily allows the movement of electric charge. For example, 18% chromium/8% nickel austenitic stainless steel has a resistivity of $\rho_{steel}=6.9 \cdot 10^{-7}$ Ω·m, copper of $\rho_{copper}=1.68 \cdot 10^{-8}$ Ω·m, PET (polyethylene terephthalate) of $\rho_{PET}=1.0 \cdot 10^{21}$ Ω·m (all values given for a temperature of 20° Celsius).

Resistivity is a material property. The resistance R of a piece of resistive material having a length l and a cross sectional area A against flow of electric current between its both ends in length direction is given by $R=\rho \cdot l/A$. Thus, the resistance of a uniform piece of material of given length can be increased by reducing its cross sectional area, as is generally known.

Perfect isolator materials do not exist. Within the present disclosure, "conductive material" shall mean a material having a resistivity below $\rho=1.0$ Ω·m (in particular, this limit may be set to below $\rho=1.0 \cdot 10^{-1}$ Ω·m) and "isolating material" shall mean a material having a resistivity above $\rho=1.0$ Ω·m (in particular, this limit may be set to above $\rho=1.0 \cdot 10^3$ Ω·m). Metals (allowing free electron flow) such as steel, copper, silver, gold, iron and metal alloys etc. are good conducting materials. Other conducting materials include amorphous carbon, conductive ceramics such as ITO and conductive polymers such as PEDOT:PSS. Conductive materials that are in particular suitable within the scope of the present disclosure are those conductors that are thermally stable at the above mentioned temperatures of about 500 degrees Celsius to about 800 degrees Celsius.

Many metals such as steel, copper, aluminum, silver, many metal alloys including iron-based alloys or copper-based alloys such as brass, bronze or Beryllium copper (ASTM B194, B196, B197) etc. are thermally stable (i.e. do not notably deform or melt or otherwise degrade so that the material is usable for an industrially sensible period) within the meaning of the present disclosure. Good isolator materials are glass, paper, dry wood, Teflon, PET, hard rubber, rubber-like polymers, isolating ceramics such as aluminum oxide or steatite and many plastics etc.

The passage of electric current through a conductor releases heat by a process known as resistive heating (or ohmic heating or Joule heating). The device for fusing the ends of thermoplastic filaments as described herein makes use of resistive heating, which leads to emission of thermal radiation, in particular infrared radiation that is absorbed by the ends of the filaments in a sufficient amount so that the thermoplastic material of the exposed ends of the filaments heats and melts and the molten material forms a ball-like structure as is generally known in the art and has been discussed before. The present disclosure proposes to use a heating plate for heating that during operation (i.e. when an electric current flows through the heating sectors) selectively emits thermal radiation at heating surfaces of heating sectors that correspond to the locations of the ends of the filaments grouped to tufts. Typically, a brush head comprises an arrangement of a plurality (i.e. at least two) such tufts. Thus it is proposed that the heating plate has at least two heating sectors that are grouped together such that their shapes and positions correspond to the shapes and positions of the ends of the tufts of filaments when they are exposed to the heating plate. Separation sectors between these heating sectors are arranged to emit less thermal radiation than the heating sectors for heating the tuft ends. As thermal radiation is predominantly emitted from the heating surfaces of these relatively small heating sectors, the proposed device does not as much heat the environment as large scale heating units but selectively heats dominantly the tuft ends. Energy may thus be saved and the heating of the filament ends can be finely controlled. A carrier in which the tufts are provided will heat less than under a known large size heating plate and can be manually treated soon after the fusing process.

It has even been found that the device and method described herein can not only be used for horizontal fusing (i.e. the tufts are arranged essentially parallel to the direction of earth gravity) but as well for vertical fusing (i.e. where the tufts are substantially inclined against the direction of earth gravity, in particular where the tufts are arranged essentially perpendicular to the direction of earth gravity). This is due to the fact that the proposed device and method allow for defined heating of the tuft ends and of a very fast cooling when the heating plate is moved away from the tufts. The molten tuft ends melt very fast and also solidify very fast when the source of thermal radiation is moved away so that essentially no "noses" of dripping plastic melt is generated. Existing fusing technologies using large sized IR lamps heat the whole environment such that at least generation of the mentioned noses during vertical fusing can hardly be avoided, in particular as these existing fusing technologies melt much more material than the herein discussed fusing technology. Because of the defined heating of the tuft ends, the volume of material that is molten is lower than in e.g. the usual IR-based fusing and the surface tension of the molten material is thus higher and effectively reduces the generation of noses or even dripping material. Thus, the proposed device and method allows for more design freedom of toothbrush production lines.

The proposed heating plate has a heating side to which the filament ends will be exposed. The heating side thus has heating surfaces corresponding to heating sectors of the heating plate, so that the heating surfaces selectively emit thermal radiation during operation of the device. The shape and size of the area of the heating surface of a heating sector shall essentially correspond to the shape and size of the tufts of filaments whose ends shall be fused together (even though this shall not exclude that the heating surface of a heating sector may be slightly larger than the tuft end to provide an essentially homogeneous heat distribution over the end of a tuft). The area of the heating surface of each of the heating sectors on the heating site of the heating plate will thus lie in a range of between about 0.25 $mm^2$ and about 250 $mm^2$, in particular in a range of between about 0.5 $mm^2$ and about 100 $mm^2$, where further in particular the upper limit may be smaller, such as about 90 $mm^2$, 80 $mm^2$, 70 $mm^2$, 60 $mm^2$, 50 $mm^2$, 40 $mm^2$, 30 $mm^2$, 20 $mm^2$, 10 $mm^2$, 5 $mm^2$, 4 $mm^2$, 3 $mm^2$, or 2 $mm^2$. A typical cylindrical tuft as used in many of today's toothbrushes may has a diameter in the range of between about 0.5 mm to about 2.5 mm, in particular in the range of between about 1.0 mm to about 2.0 mm, further in particular in the range of between about 1.3 mm to about 1.8 mm. As an example, a circular tuft having a diameter of 1 mm has an area of about 0.785 $mm^2$ The respective heating sector may then have a cylindrical shape and an area of as well about 0.785 $mm^2$ or may be somewhat larger, e.g. may have a circular shape and an area of about 1.13 $mm^2$, which would relate to a circular area having a diameter of 1.2 mm even though relatively larger heating sectors are also contemplated. Some toothbrushes comprise large sized single tufts such as the Oral-B CrossAction® toothbrush, which has a large size single tuft at its foremost end having an area of about 28 $mm^2$ (30 $mm^2$ may then be considered as an appropriate upper limit). Obviously, even larger single tufts can be contemplated (50 $mm^2$ may then be considered an appropriate upper limit). The individual tufts are each arranged with a distance to each other, as otherwise they would form a single tuft with densely arranged filaments. The tufts are arranged with a distance to allow the free filament ends of the final toothbrush to move when applied with a force against a tooth surface. Typical distance between neighboring tufts of a tuft field of a toothbrush may lie in a range of between about 0.2 mm to about 5.0 mm, in particular in a range of between about 0.5 mm and about 2.0 mm. In some of today's toothbrushes a distance between neighboring tufts of about 0.8 mm to about 1.6 mm is employed. The distance between the heating surfaces of the neighboring heating sectors are thus typically in the same order or may be somewhat smaller if the heating surfaces are somewhat larger than the surfaces of the respective tuft ends that are to be fused, i.e. the distances between the heating surfaces of the heating sectors measured on a plane parallel to the heating side of the heating plate is thus in a range of between about 0.1 mm to about 5.0 mm, in particular in a range of between about 0.3 mm and about 2.0 mm. In some embodiments, the heating plate may comprise at least two groups of heating sectors, wherein the heating sectors of each group may be aligned with the tufts for another brush head. In such embodiments, the distance between neighboring heating surfaces belonging to neighboring groups may thus be larger than the distance of the heating surfaces of a group.

In some embodiments, the selective heating is provided by a heating plate made from a conductive material such as stainless steel and a reduced thickness of the conductive material in the heating sectors versus the separating areas of conductive material bordering at least partly the heating sectors so that the resistive heating is increased in the heating sectors when an electric current flows through the heating plate. This shall not exclude that the heating plate may have cut-outs bordering the heating sectors and only bridges of thicker conductive material connecting the heating sectors of thinner conductive material to enable electric current flow through the heating sectors (i.e. the heating plate does not need to be free of through holes extending from a back side of the heating plate to the front side, which also is the heating side of the heating plate and/or cutouts). Through-holes and cutouts in the heating plate also serve to allow for airflow through the heating plate and thus for cooling of areas around the heating sectors such as the mentioned bridges.

In some embodiments, higher thermal emission of the heating surfaces of the at least two heating sectors is achieved by a different average profile roughness $R_a$ on the heating surfaces than on the bordering surfaces made of conductive material of the separation sectors. Such average profile roughness differences can e.g. be combined with different layer thicknesses of the conductive material of the heating sectors vs. the conductive material of the separation sector, but the layer thickness may also be constant. E.g. the heating plate may be realized by a sheet of electrically conducting metal such as stainless steel sheet material having a thickness of between 100 μm to 1.0 mm, in particular of about 0.5 mm. The heating sectors are then formed by providing a higher average profile roughness on the heating surfaces of the heating sectors than the average profile surface roughness of the respective surface of the separation sector(s). Typical values for the average profile roughness of the heating surfaces are $R_a \geq 20$ μm, in particular $R_a \geq 25$ μm (an upper limit of $R_a \leq 200$ μm, in particular of $R_a \leq 200$ μm and further in particular of $R_a \leq 50$ μm may be employed). Typical values for the average profile roughness of the surface of the separation sector(s) are $R_a \leq 10$ μm, in particular $R_a \leq 5$ μm, further in particular $R_a \leq 2.0$ μm. Typical polished surfaces have an average profile roughness of $R_a \leq 1.0$ μm (where finish grinding results in an average profile roughness of $R_a \leq 0.2$ μm). The rougher heating surfaces may be generated by sand blasting, selective laser melting of material particles such as of metal powder or ceramic powder onto a surface having a low average profile roughness, or by laser ablation. The average profile roughness is measured in accordance with DIN EN ISO 4287.

In some embodiments, at least one of the heating sectors has a concave heating surface on the heating side of the heating plate so that the thermal radiation will be more focused than may be possible with a flat heating surface. In some embodiments, at least two heating sectors are made from differently thick conductive material and/or from materials of different resistivity so that different amounts of thermal radiation are emitted per unit area from these heating sectors, which allows controlling the heat delivered at the different ends of tufts (which different tufts may comprise filaments made from different materials or of different diameter requiring different heat levels for melting).

In some embodiments, the heating plate comprises at least two groups of heating sectors, where each group comprises at least two of the heating sectors, optionally wherein each of the groups of heating sectors have identical relative arrangement of their respective heating sectors. This allows fusing the ends of tufts of filaments associated with different brush heads at a single instant with one heating plate.

In some embodiments, at least one heating surface is a non-flat surface, e.g. may be concavely formed. Additionally or alternatively, at least one of the heating surfaces may be arranged at a different distance level in emission direction than another heating surface (where the emission direction is essentially perpendicular to the heating side of the heating plate or, in other words, perpendicular to the length and width extension of the heating plate, where the depth extension is parallel with the emission direction). These features allow a better adaption of the heating of the tuft ends to the topology of the tuft arrangement.

Generally, the heating plate may be made from sintered, in particular laser sintered material, in particular conductive material, even though the heating plate may also comprise isolating material.

Figure 1B:
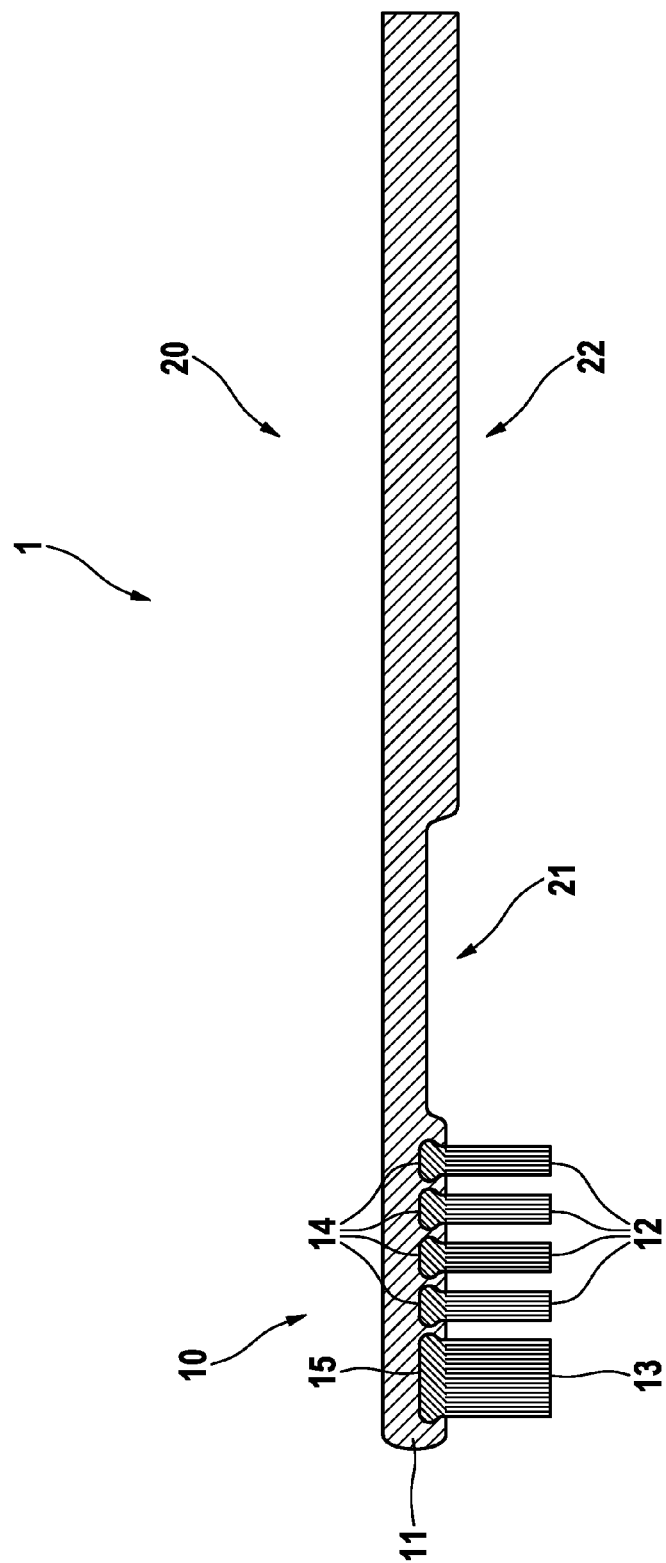
FIG. 1B is a longitudinal cut of the toothbrush shown in FIG. 1A, where it can be seen that the tufts have fused ends that are embedded in the material forming the head of the toothbrush.

The backside of the heating plate opposite to the heating side may be connected with a backplate that may provide stability as the heating plate may comprise many through holes outside of the heating sectors and/or the heating sectors may comprise thin layers of conductive material not having a high inherent stability. The backplate may in particular be made at least partially from an isolating material as electric current should flow only through the heating plate and not through the backplate. Alternatively or additionally, the backplate may be insulating to effectively reduce thermal energy loss via the backside of the heating plate. FIGS. 1A and 1B are schematic depictions of an exemplary manual toothbrush 1 (FIG. 1A) and of a longitudinal sectional cut through this toothbrush 1 in a plane indicated by line A-A in FIG. 1A (FIG. 1B). The toothbrush 1 comprises a head 10 and a handle 20 having a neck region 21 and a grip region 22. The head 10 has tufts 12, 13 that are implanted in a carrier 11, where twelve essentially identical tufts 12 of cylindrical cross section are arranged in three longitudinal rows that each have four tufts, which rows are parallel to each other, and a larger tuft 13 of essentially rectangular cross section is arranged at a foremost end of the head 10. As an example, the tufts 12 may each have 20 to 60 bristle filaments (e.g. extruded thermoplastic plastic filaments (e.g. made from PA6.12, Nylon)), while the tuft 13 may have 100-300 bristle filaments. In the shown embodiment, the tufts 12, 13 all have a fused end 14, 15 that is embedded in the material of the carrier 11.

Figure 2:
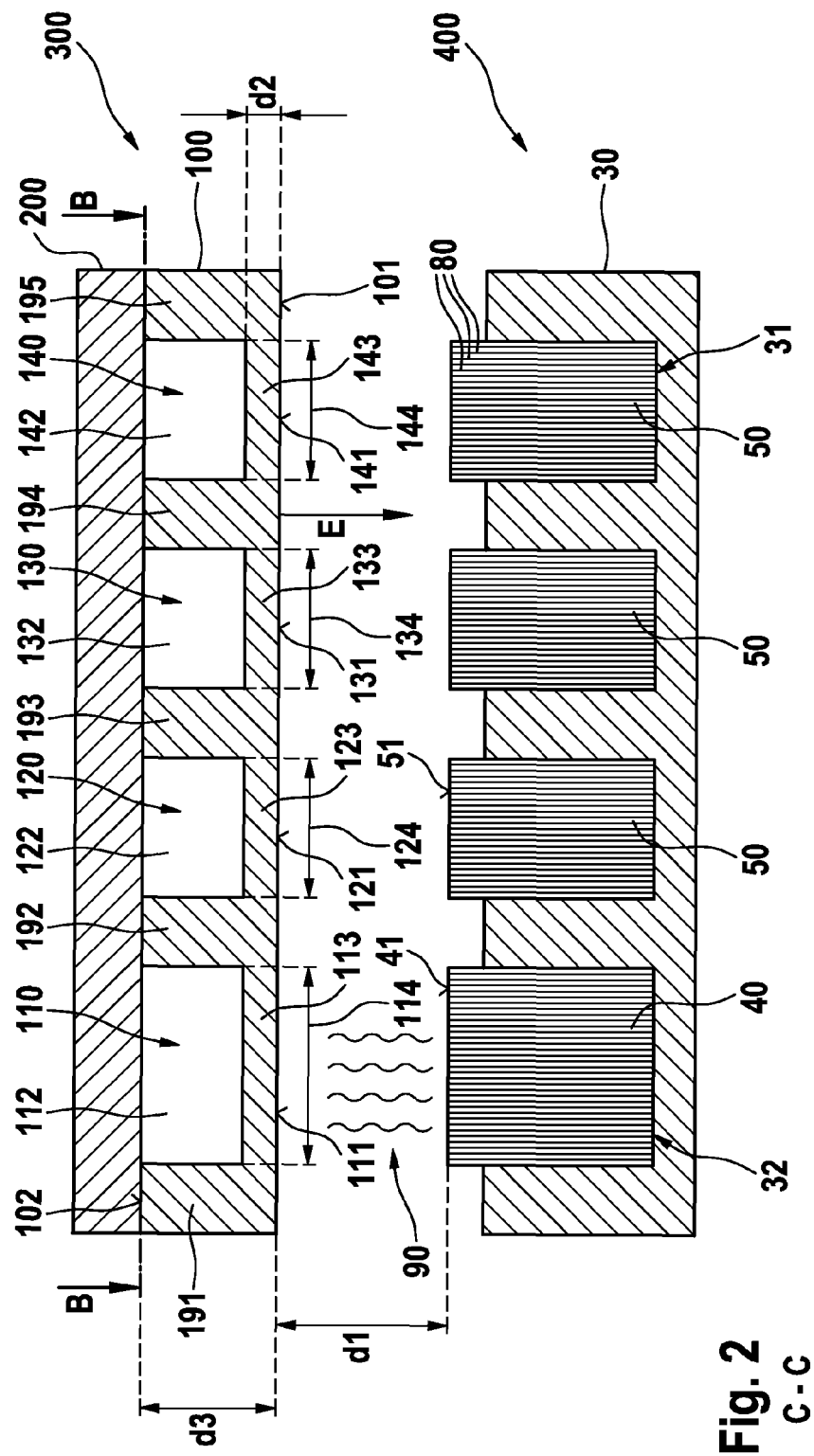
FIG. 2 is a cross sectional cut through an exemplary embodiment of a device for fusing the ends of tufts of thermoplastic filaments taken in a plane indicated by line C-C in FIG. 3, where in addition a cross sectional cut through a hole plate is shown, by which hole plate tufts are provided having ends to be fused.

As is known in the art, the tufts may be provided for fusing in a hole-plate from which the ends of the tufts extend (as is schematically shown in FIG. 2). The ends of the tufts are then exposed to heat until they melt and the filaments of a tuft fuse together forming a ball-like structure. In some embodiments, a stamp may be pushed onto the hot fuse-balls until they are flat as is indicated in FIG. 1B, but this is an optional step. The fused tufts may then be disposed (together with the hole-plate in which they are provided) in a cavity of a mold in which at least the carrier 11 is (injection) molded around the fused tuft ends. In the same step of (injection) molding the carrier also a handle 20 may be molded as an integral part together with the carrier 11. In some embodiments, the head of an electric toothbrush may be molded without any further handle portions. While a manual toothbrush is shown, a brush head suitable for an electric toothbrush or any other brush ware (e.g. a hair brush, shoe brush, cloth brush etc.) may be realized in the same technology.

In the following, an exemplary embodiment of a device 300 for fusing the ends of tufts in accordance with the present disclosure is discussed and it is referred to FIGS. 2, 3, and 4, which depict different cross-sectional cuts through the device. FIG. 2 also schematically depicts a tuft unit 400 by which the tufts are provided at the fusing device 300.

Figure 3:
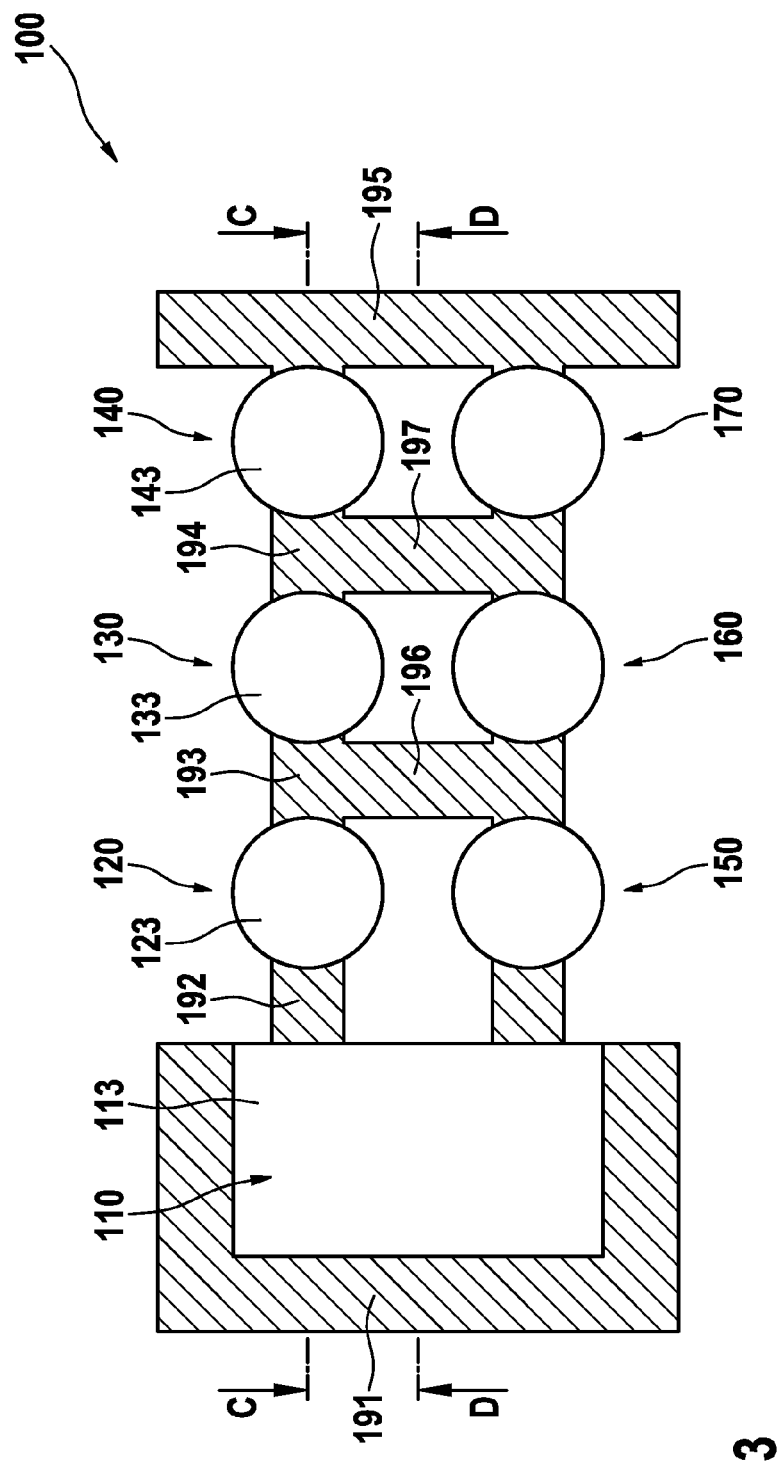
FIG. 3 is a cross-sectional cut through the device shown in FIG. 2 along a plane indicated by line B-B in FIG. 2.

FIG. 2 is a schematic cross sectional cut (taken along a line C-C as indicated in FIG. 3) through the exemplary device 300 for fusing the ends of tufts and additionally through a tuft unit 400 (the distance between the device 300 and the tuft unit 400 is not to scale). The tuft unit 400 comprises a hole plate 30 in which tufts 40, 50 of thermoplastic filaments 80 are provided such that the ends 41, 51 of the tufts extend beyond the hole plate 30 and can be exposed to thermal radiation 90 that is emitted from the device 300 as will be further explained. The hole plate 30 here comprises blind holes 31, 32 in which the tufts 40, 50 are disposed, even though through holes may also be suitable.

The device 300 for fusing the ends of tufts comprises an example embodiment of a heating plate 100 and a backplate 200 (which as such is optional) and further an electric current source 310 (shown in FIG. 4) for switchable generation of an electric current flow through the heating plate 100. The heating plate 100 is at least partly made from a conductive material such as stainless steel or copper or aluminum or any other conductive material. The heating plate 100 is structured and comprises heating sectors 110, 120, 130, 140 (further heating sectors 150, 160, 170 are shown in FIG. 3) that are aligned in position and shape (potentially also size as was explained above) with the position and shape of the ends 41, 51 of the tufts 40, 50 so that the heating sectors 110, 120, 130, 140 and the ends 41, 51 of the tufts can be brought into a precisely aligned relative position. The heating plate 100 has a heating side 101 that is intended for emission of thermal radiation 90 for fusing the ends 41, 51 of the tufts 40, 50. Each heating sector 110, 120, 130, 140 is associated with a heating surface 111, 121, 131, 141 on the heating side 101 of the heating plate 100. When a sufficient electric current flow is switched on through the heating plate 100, the heating surfaces 111, 121, 131, 141 emit thermal radiation 90 in an amount suitable for melting and fusing the ends of the filaments of the tufts 40, 50 arranged at a given distance d1 in the general emission direction E such the molten ends 41, 51 of the tufts 40, 50 form ball-like structures ("fuse balls") of molten material that connect the filaments once the fuse balls have cooled. In order to arrange the heating surfaces to emit sufficient thermal radiation, the resistance of the conductive material comprised by the heating sectors may be enlarged versus the resistance of conductive material in areas surrounding the heating sectors. In FIG. 2 (in combination with FIG. 3) it can be seen that the layer thickness d2 (measured along the emission direction E) of the conductive material portions 113, 123, 133, 143 of the heating sectors 110, 120, 130, 140 is smaller than the layer thickness d3 (measured along the emission direction E) of the structures of conductive material of separation areas between neighboring heating sectors, which conductive material is forming bridges 191, 192, 193, 194, 195 (and bridges 196, 197 as shown in FIG. 3) between the heating sectors. As had generally been explained above, the resistance of a piece of material of given length is increased by reducing its cross sectional area. Thus, the layers of thinner material thickness at the heating sectors have higher resistances than the bridges around them and thus more ohmic heating is generated in these thinner material layers when an electric current flows through the heating plate 100 than in the bridges. In some embodiments, the material is a stainless steel, the thickness of the thinner material layers is about 0.5 mm and the electric current is up to 200 Ampere. The layer thickness of the conductive material in the heating sectors can be adapted to the needed amount of thermal radiation during fusing at the location of the respective heating sector (in FIG. 7 it is shown that different heating sectors may have a different layer thickness of the conductive material). The layer thickness in the heating sectors can be controlled by the depth of recesses 112, 122, 132, 142 in the heating plate 100 extending from a backside 102 of the heating plate 100 towards the heating side 101. The width 114, 124, 134, 144 of the heating sectors 110, 120, 130, 140 in the cut plane is adapted to the width of the tuft ends 41, 51.

A backplate 200 made from an electrically isolating material is secured to the backside 102 of the heating plate 100. The backplate 200 is an optional feature and on the one hand can provide additional stability, in particular when the heating plate comprises many through holes and/or cutouts (as can be seen in FIG. 3 for the here shown exemplary embodiment), and on the other hand may be thermally insulating to effectively reduce thermal radiation loss via the backside 102 and/or heating of parts located in the backside region of the heating plate 100.

FIG. 3 is a cut through the device 300 in a plane as indicated by line B-B in FIG. 2. In total, the here shown heating plate 100 has seven heating sectors 110, 120, 130, 140, 150, 160, 170, where a larger heating sector 110 coincides with a larger tuft (tuft 40 in FIG. 2) and the other six heating sectors are arranged in two parallel lines of three heating sectors each. Obviously, any other shape and number and arrangement of heating sectors can be contemplated based on the topology of the tufts to be fused. In FIG. 3 it is shown that bridges 191, 192, 193, 194, 195, 196, 197 of conducting material connect the heating sectors; these bridges form part of the separation areas between the heating sectors; the through-holes also form part of the separation areas. The bridges are arranged to emit less thermal radiation than the heating sectors and the through-holes obviously emit no thermal radiation. In operation, when a sufficient electric current flows through the heating plate 100, the heating sectors glow so that sufficient thermal radiation 90 is emitted as schematically indicated in FIG. 2 to melt and fuse the ends of tufts, while the lower resistance bridges stay cooler and may stay at a cooler level even over longer periods due to cooling by the ambient air (a blower may initiate an airflow through the device 300 for cooling reasons). It is also contemplated that an active cooling is used, e.g. via tubes through the bridges in which a cooling agent is circulated.

Figure 4:
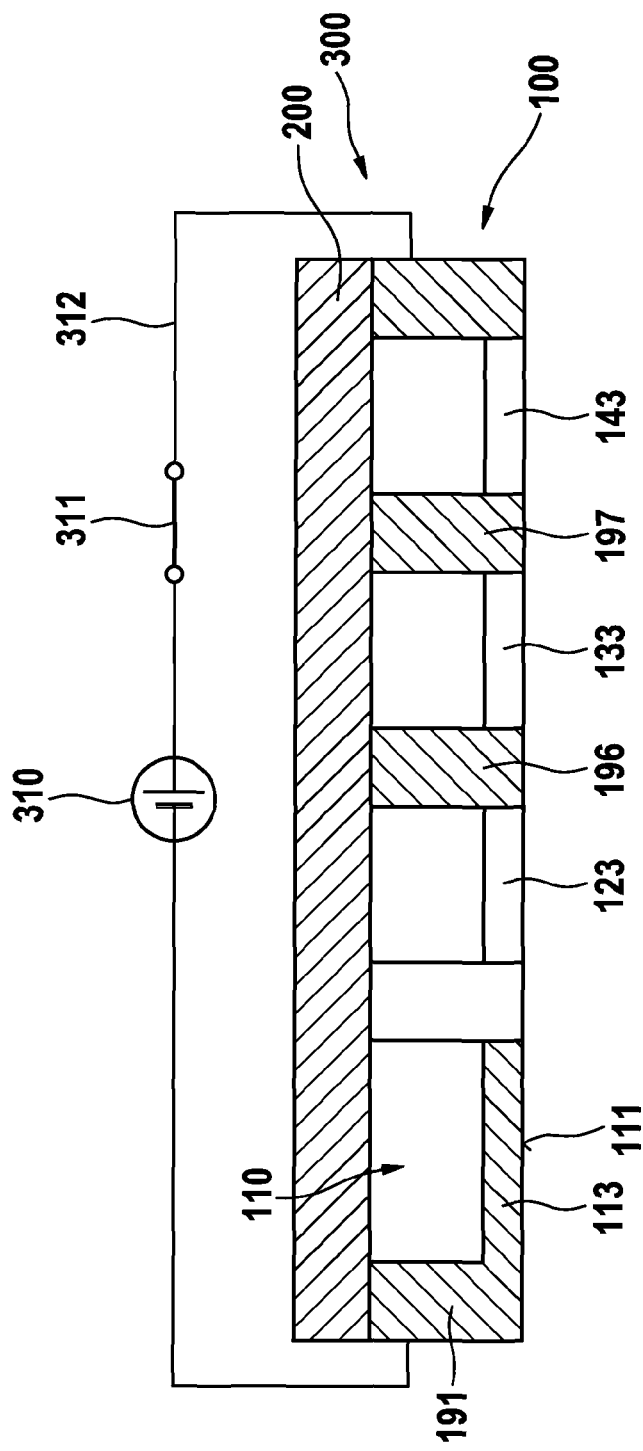
FIG. 4 is a cross-sectional cut through the device shown in FIG. 2 along a plane indicated by line D-D in FIG. 3.

FIG. 4 is a cross sectional cut through the device 300 along a plane indicated by line D-D in FIG. 3. It is shown that an electric current source 310 is connected by wires 312 with the heating plate 100 and a switch 311 can be controlled for switchable electric current flow.

Figure 5:
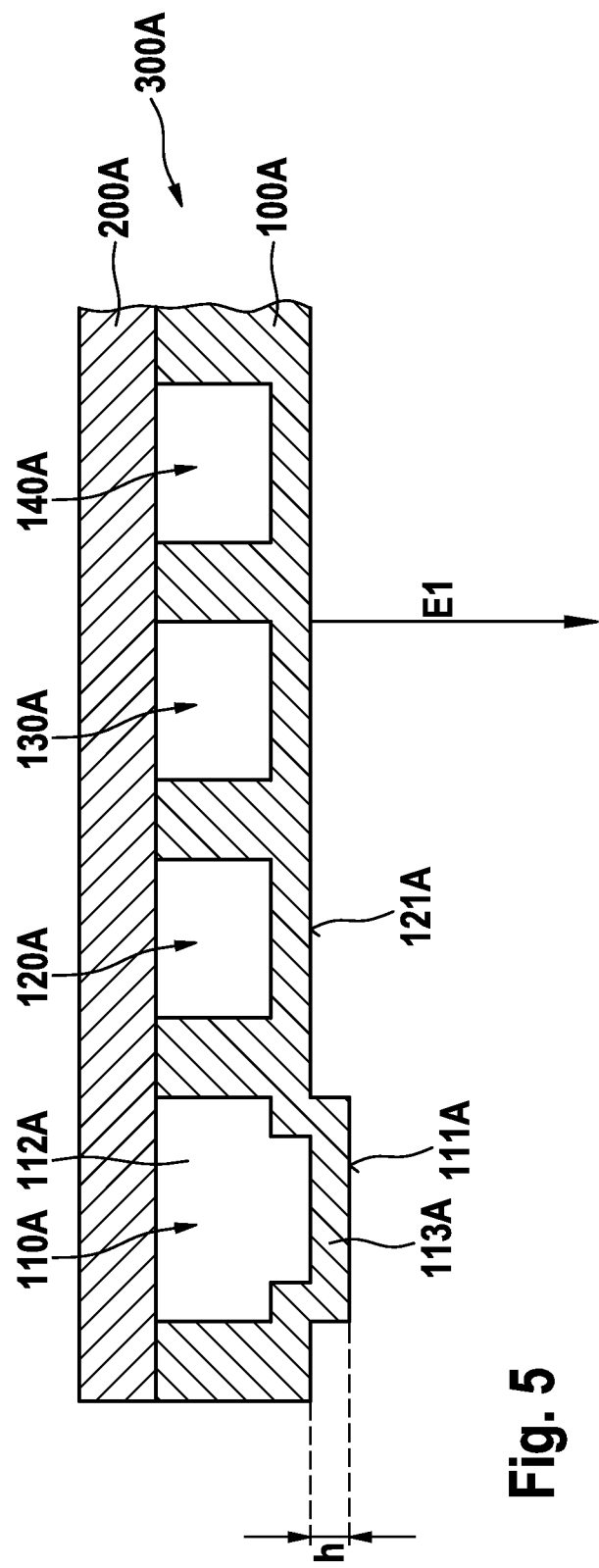
FIG. 5 is a cross sectional cut through another exemplary embodiment of a device for fusing the ends of tufts of thermoplastic filaments.

FIG. 5 is a schematic depiction of a portion of another exemplary embodiment of a device 300A for fusing the ends of tufts. As a difference to the previously shown embodiment, the heating sector 110A and the heating sectors 120A, 130A, 140A have essentially the same layer thickness of conductive material, but the heating surface 111A of the heating sector 110A is arranged at a different distance level in emission direction E1 than the other heating surfaces 121A, 121A, 131A. The emission direction may be parallel with the direction of earths' gravity or at an angle thereto (in particular essentially perpendicular to the direction of earths' gravity in an arrangement with "vertical" fusing). The difference h in the distance level may be used to stronger heat a certain tuft end or to accommodate situations where also the tuft ends lay on different height levels.

Figure 6:
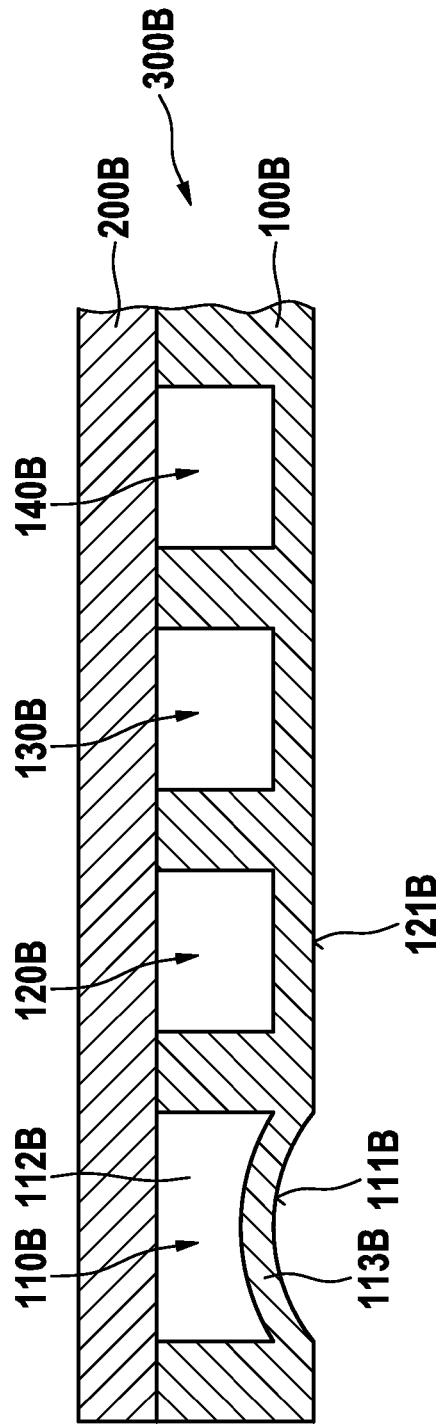
FIG. 6 is a cross sectional cut through a further exemplary embodiment of a device for fusing the ends of tufts of thermoplastic filaments.

FIG. 6 is a schematic depiction of another device 300B for fusing the ends of tufts, where a heating surface 111B of a heating sector 110B is a non-flat surface and is here concavely formed so that a focusing effect of the emitted thermal radiation is achieved.

Figure 7:
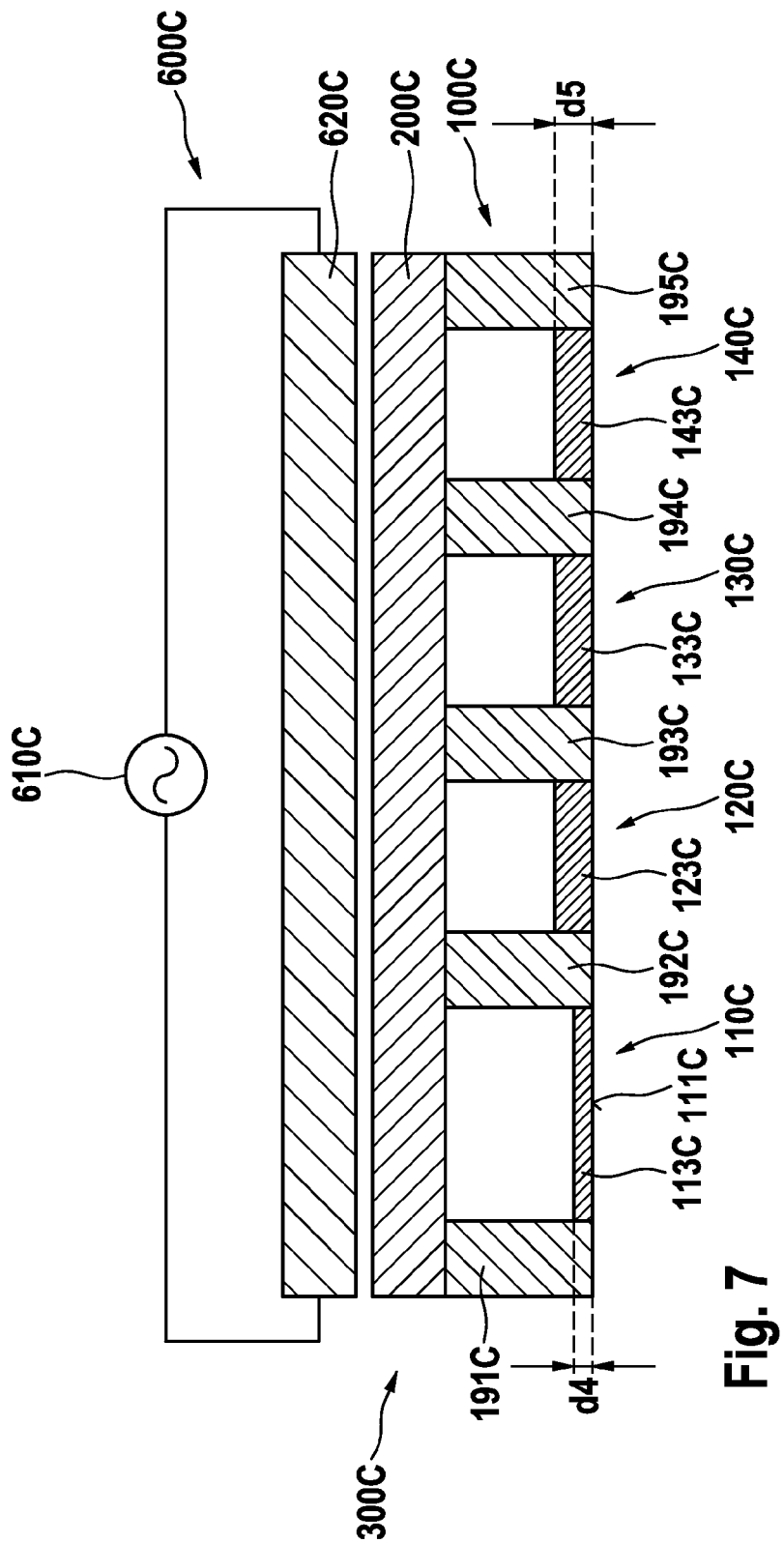
FIG. 7 is a cross sectional cut through an even further exemplary embodiment of a device for fusing the ends of tufts of thermoplastic filaments that comprises an inductive heating unit.

FIG. 7 is a schematic depiction of a further embodiment of a device for fusing the ends of tufts having the same general set-up as the device 100 shown in FIG. 2, but here no direct coupling of a electric current source with the heating plate 100C is realized, but an inductive unit 600C is arranged above the heating plate 100C (and above the backplate 200C) that comprises an AC source 610C and a coil unit 620C. The inductive unit 600C typically is arranged to provide a periodically changing electromagnetic field that induces an eddy electric current in the conductive material of the heating plate 100C. In FIG. 7 it is also indicated that the material from which the heating sectors 110C, 120C, 130C, 140C are realized may be different to the material from which the bridges 191C, 192C, 193C, 194C, 195C are realized. It is also possible that different heating sectors comprise different conductive material. In some embodiments, the material of the bridges may be an insulating material. In some embodiments, the bridges 191C, 192C, 193C, 194C, 195C may be made from a lower resistivity material than the conductive material portions 113C, 123C, 133C, 143C of the heating sectors 110C, 120C, 130C, 140C. As is also indicated in FIG. 7, at least one of the heating sectors may have a layer thickness d4 of the conductive material that is different to the layer thickness d5 of another heating sector. Here, it is shown that the larger heating sector 110 has a smaller layer thickness d4 as the layer thickness d5 of the other heating sectors 120, 130, 140, 150. It is of course possible that each heating sector has a different layer thickness. It is noted that different layer thickness, different conductive material, non-flat heating surfaces, different distance levels etc. may all be combined in all possible ways.

Figure 8:
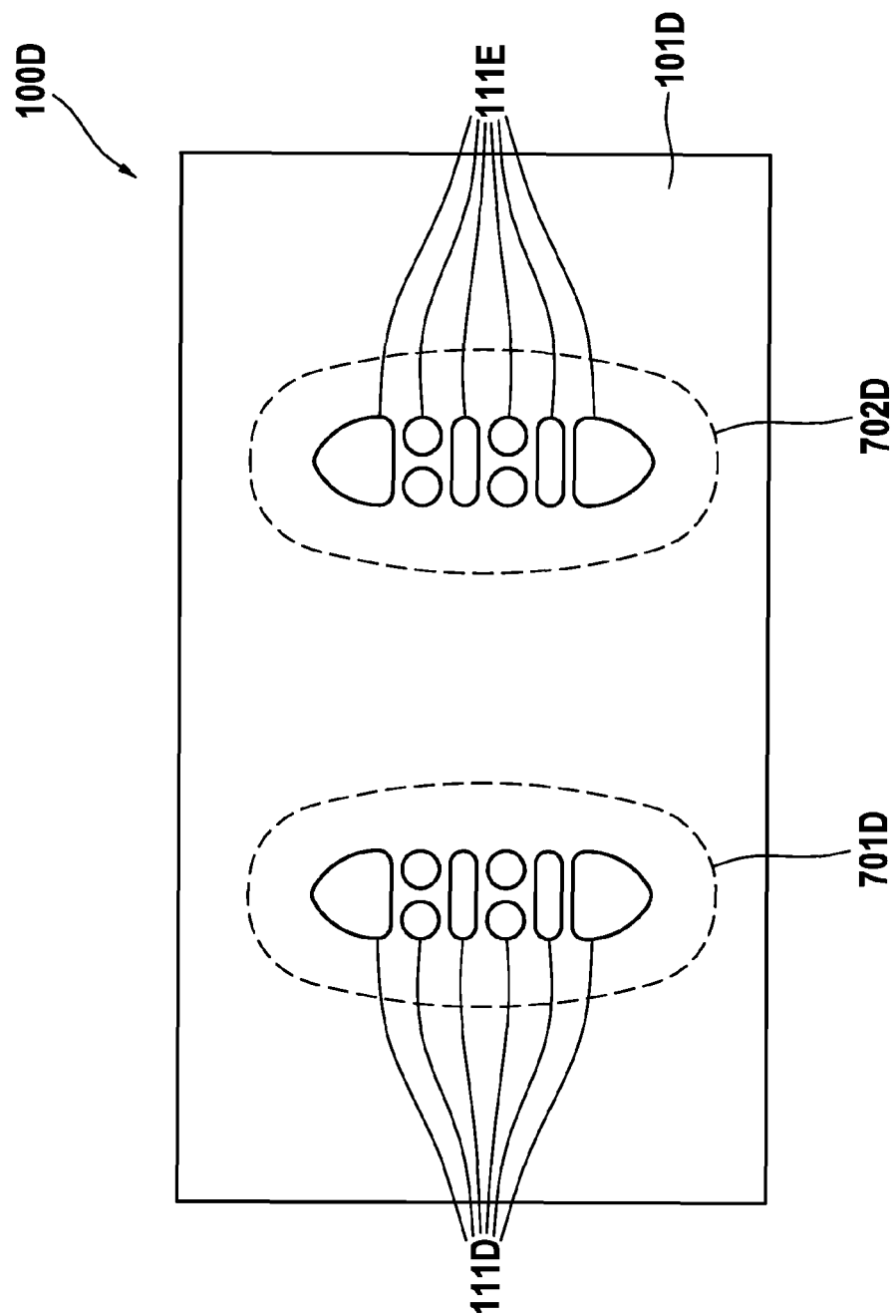
FIG. 8 is a schematic depiction of a heating plate with a top view onto the heating side of the heating plate, where the heating surfaces of two groups of heating sectors are shown.

FIG. 8 is a schematic depiction of the heating side of an exemplary embodiment of a heating plate 100D used in a device for fusing the ends of tufts of thermoplastic filaments. The heating plate 100D comprises two groups 701D and 702D having each eight heating sectors of identical relative arrangement, where the heating surfaces 111D and 111E of the heating sectors are indicated by dotted lines. It shall be clear that obviously more than two groups of heating sectors can be realized on a heating plate and that it is also not excluded that at least two groups of heating sectors differ from each other in at least the size or relative position etc. of one of the heating sectors. The provision of two or more groups of heating sectors on a heating plate allows fusing the ends of tufts of two or more brush heads in one fusing step. Then, e.g., two or more hole-plates comprising tufts as shown in FIG. 2 may be provided in positional alignment with each of the groups of heating sectors in order to fuse the tuft ends in a single fusing step. In the shown embodiment, the heating sectors and in particular the heating surfaces 111D and 111E may be made from conductive material embedded in isolating material 101D forming the rest of the heating plate 100D.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method of fusing without contact the ends of thermoplastic filaments grouped together to form at least two tufts arranged with a distance therebetween, the method comprising the steps of:
   providing an arrangement of at least two tufts of thermoplastic filaments, the tufts having a distance therebetween;
   providing a heating plate at least partly made from a conductive material and structured to have at least two heating sectors separated from one another by at least one separation sector structured to emit less thermal radiation then the heating sectors, wherein each of the heating sectors comprises conductive material and has a heating surface on a heating side of the heating plate, the surfaces corresponding in shape and position to the shape and position of the ends of the tufts;
   exposing the ends of the tufts to the heating plate such that the tuft ends and the heating sectors are aligned with each other; and
   generating an electric-current flow through the heating sectors so that the heating surfaces of the heating sectors emit thermal radiation that is absorbed by the ends of the filaments whereby the ends of the filaments melt and the filaments of each of the at least two tufts are fused together.

2. A device for fusing without contact the ends of thermoplastic filaments grouped into at least two tufts arranged with a distance therebetween, the device comprising a heating plate that is at least partly made of a conductive material for emitting thermal radiation when an electric current flows through the conductive material, wherein the heating plate is structured to have at least two heating sectors, each comprising conductive material, the heating sectors being separated from one another by at least one separation sector structured to emit less thermal radiation than the heating sectors, wherein each of the heating sectors has a heating surface on a heating side of the heating plate, each of the heating surfaces having an area of from about 0.25 mm$^2$ to about 250 mm$^2$.

3. The device of claim 2, wherein each of the heating sectors has a heating surface smaller than 100 mm$^2$.

4. The device of claim 2, wherein the at least two heating sectors have differently shaped heating surfaces.

5. The device of claim 2, wherein at least one of the heating sectors comprises a layer of conductive material that is thinner in an emission direction than a layer of conductive material of the separation sector at least partly bordering the at least one heating sector.

6. The device of claim 5, wherein the thickness of the conductive material of the heating sector is lower than about 1.0 mm.

7. The device of claim 5, wherein the heating surface of the at least one heating sector has an average profile roughness that is higher than an average profile roughness of an emission surface of the separation sector.

8. The device of claim 7, wherein the average profile roughness of the heating surface is $R_a \geq 20$ µm and the average profile roughness of the emission surface of the separation sector is $R_a \leq 10$ µm.

9. The device of claim 8, wherein the average profile roughness of the emission surface of the separation sector is $R_a \leq 2$ µm.

10. The device of claim 2, wherein at least one of the heating sectors comprises a conductive material having a higher resistivity than a conductive material comprised by the separation sector at least partly bordering the at least one heating sector.

11. The device of claim 2, wherein at least the heating surfaces of the heating sectors are formed of conductive material and are embedded in an isolating material forming the separation sector.

12. The device of claim 2, wherein the heating surface of at least one heating sector is a non-flat surface.

13. The device of claim 12, wherein the heating surface is concavely formed.

14. The device of claim 2, wherein the heating plate comprises at least two groups of heating sectors, each comprising at least two of the heating sectors.

15. The device of claim 14, wherein each of the groups of heating sectors have identical relative arrangement of their respective heating sectors.

16. The device of claim 2, wherein the heating plate is connected with an isolating backplate on a side opposite to the heating side of the heating plate.

17. The device of claim 2, wherein the heating plate comprises a block of conducting material having recesses extending from a back side of the heating plate opposite to the heating side into the heating plate at the locations of the heating sectors.

18. The device of claim 17, wherein the heating plate has at least one through-hole or cut-out arranged adjacent to at least one of the heating sectors, wherein the through-hole or cut-out at least partly forms the separation sector.

19. The device of claim 2, wherein at least a part of the heating plate is made from a sintered conductive material.

20. The device of claim 2, wherein the at least two heating sectors are arranged such that their respective heating surfaces are at a different distance level with respect to an emission direction.

21. The device of claim 2, wherein the device comprises an induction unit for inductively generating an electric-current flow through the heating sectors.

22. The device of claim 2, wherein the device comprises an electric-current source coupled with the heating plate.

* * * * *